April 18, 1944. T. A. BOWERS 2,346,897
MULTIPIECE PISTON RING
Filed April 30, 1941
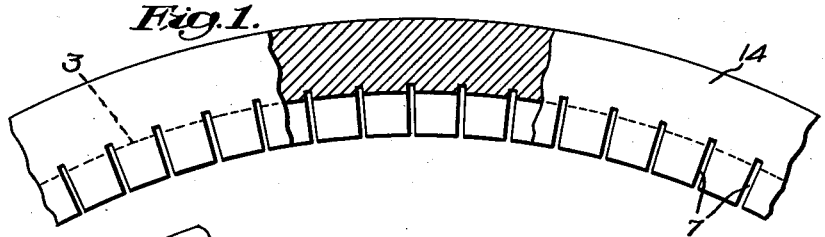
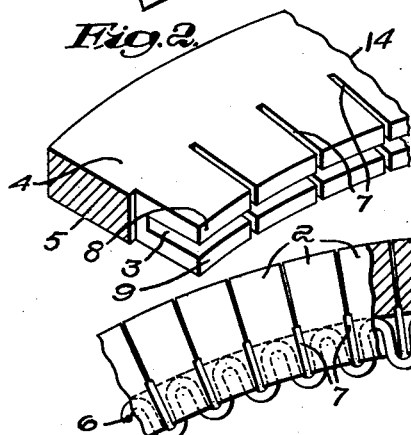
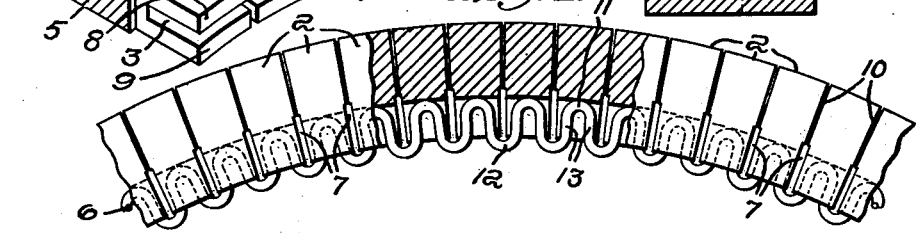
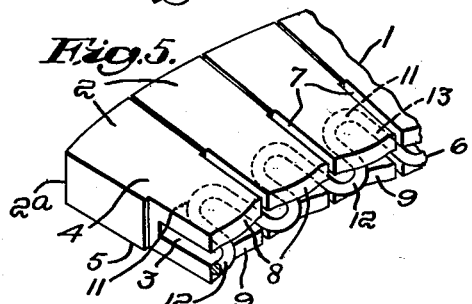
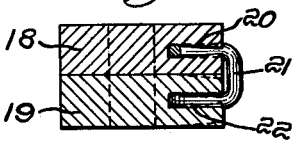
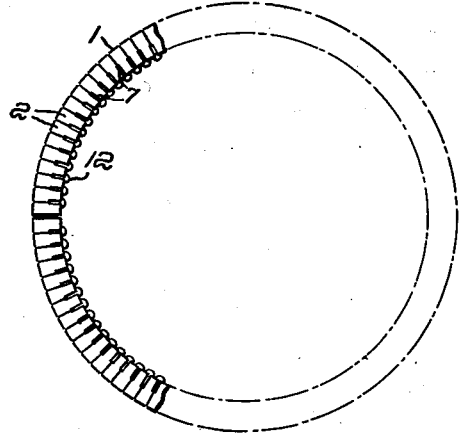
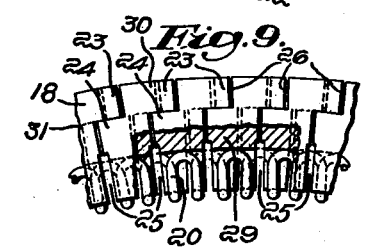
Inventor:
Thomas A. Bowers
by Werner H. Hamilton
Attorney Patented Apr. 18, 1944

2,346,897

UNITED STATES PATENT OFFICE 2,346,897

MULTIPIECE PISTON RING

Thomas A. Bowers, Mattapoisett, Mass., assignor to Power Research Corporation, Boston, Mass., a corporation of Massachusetts Application April 30, 1941, Serial No. 391,121

4 Claims. (Cl. 309—44)

This invention relates to piston rings and more especially to piston rings of the oil metering type.

The principal object of the invention is to improve piston rings and to devise ring structures having improved oil scraping edge portions for metering oil from the wall of a cylinder. Another object of the invention is to provide ring structures of novel flexible and resilient character. Still another object of the invention is to provide a cheap, efficient, and durable piston ring which is made up of two or more kinds of piston ring material, and which combines novel hardness and resiliency characteristics. Still another object of the invention is to provide a novel means of attaching pieces of piston ring material one to another. The invention also aims to devise a novel piston ring which is made up of a plurality of separated pieces of piston ring material, so arranged and supported as to be substantially resistant to the passage of gases in directions axially, circumferentially and radially of the ring.

The nature of the invention, and its objects, will be more fully understood from the following description of the drawing and discussion relating thereto.

In the accompanying drawing:

Fig. 1 is an enlarged fragmentary plan view and partial cross section of a strip of piston ring material and illustrates a step in the method of making the piston ring of the invention.

Fig. 2 is an enlarged fragmentary perspective view of the strip of piston ring material shown in Fig. 1.

Fig. 3 is a vertical cross section of a strip of piston ring material similar to that illustrated in Figs. 1 and 2.

Fig. 4 is an enlarged fragmentary plan view illustrating further steps in the method referred to.

Fig. 5 is an enlarged fragmentary perspective view of the ring of the invention.

Fig. 6 is a plan view of the ring;

Fig. 7 is an enlarged cross sectional view illustrating a plurality of piston rings, each of which is similar to the rings shown in Figs. 5 and 6.

Fig. 8 is an enlarged vertical cross section of a modification of piston ring; and Fig. 9 is an enlarged fragmentary plan view of the ring modification illustrated in Fig. 8.

In the construction shown, numeral 1 generally refers to a ring of the invention which includes a plurality of segments or pieces 2 of piston ring material secured in contiguous relation to one another. The segments 2 are preferably formed of a material such as steel or other suitable metal adapted to provide a suitable wearing surface for engaging with cylinder walls of internal combustion engines. As may be noted from an inspection of Fig. 5, the segments constitute relatively thin pieces of metal of a radial width much greater than their axial thickness.

An example of a segment of suitable thickness is one having a thickness of from $\frac{1}{16}$ to $\frac{1}{8}$ of an inch. This portion is designed to provide, at the outer periphery of the ring, relatively thin edges 2a, particularly adapted to function as oil scraping or oil metering surfaces. The thin edges are intended to correspond to the thin oil scraping edges of conventional C-type steel oil scraping rings, and may, if desired, be tapered or otherwise reduced to form even sharper oil scraping edges than that shown in the drawings.

Numeral 3 refers to grooves formed at the inner peripheral edges of each of the segments 2. These grooves 3 extend radially of the segments, and as illustrated in Fig. 5, occur throughout a substantial part of the radial width of the segments, to provide spaced-apart side portions 8 and 9.

The segments are arranged adjacent one another in an annular row so that upper and lower surfaces 4 and 5 respectively of each of the adjacent segments occur in parallel planes and constitute land surfaces for seating or sealing the ring in a piston ring groove. Each pair of side portions 8 and 9 of one segment are circumferentially spaced apart from respective side portions of adjacent segments by means of slots or openings 7 which extend throughout a part of the radial width of the ring. The segments 2 are further separated at their outer peripheral portions by means of radially extending cuts or interstices 10, which connect with the openings 7 and are of a lesser circumferential width than the openings 7. In a preferred embodiment of the ring, the cuts 10 are of a circumferential width approximately .003 to .004 of an inch. This width allows each of the segments to be compacted against one another in amounts necessary to proper functioning of the ring as will be hereinafter described.

Numeral 6 refers generally to an annular member for attaching the segments to one another in a novel and desirable manner. This annular member is preferably formed of a resilient metal such as a steel wire, or other suitable material of a tough, resilient character, and includes a series of internal bent portions 11, external bent portions 12, and connecting portions 13, all of which extend in a plane at right angles to the axis of the ring as shown in Figs. 4 and 5.

The connecting member 6 is mounted in the grooves 3 of the segments 2 with the inner bends 11 being disposed against a side of the grooves 3 (more clearly shown in Fig. 4), and with the circumferential spacing of the web portions 3 being such that two of these connecting portions may be included between the separated side portions 8 and 9 of a respective segment. The annular member 6 is further provided with a radial width which allows the outside bonds 12 to extend beyond the inner peripheries of the segments, when the connecting member 6 is in abutting relation with the side of groove 3 as described above.

The spaced-apart side portions 8 and 9 are firmly clinched together upon the member 6, and engage a substantial portion of its radial width. However, the projecting portions of the bends 12 are kept free to flex. By this construction, it will be seen that the internal bends 11 and connecting portions 13 are supported throughout their radial width by the separated side portions 8 and 9, and the external bends 12 extend circumferentially across the openings 7 to form connectors for attaching the segments one to another in a resiliently movable manner.

The clinched association of the sides 8 and 9 with the annular member 6 may be effected in any suitable manner as by hammering or rolling the edges against one another, or in other ways. The external bends 12 may form connectors of varying size and the relative proportion between said connectors and the segments may vary. Figs. 4 and 5 illustrate a preferred relationship between the connectors and the segments, but obviously other proportions may be employed. As one example of material for the annular member, there may be cited a resilient steel wire of .020 of an inch in diameter. Other sizes may be employed if desired.

In Figs. 1-4 inclusive a preferred method of making a ring such as that shown in Figs. 5 and 6 has been illustrated. A length of piston ring material 14 of suitable character, such as a strip of steel or other metal, preferably provided in a curved form as in a helix, is cut along one edge to form the groove 3 which extends inwardly for a part of its width. The strip is also cut, either before or after formation of the groove 2, as for example by sawing or milling, to provide openings 7 which also extend throughout only a part of the radial width of the ring, as shown in Figs. 1, 2 and 3.

Thereafter an annular member, such as a length of reversely folded resilient steel wire formed as described above, is disposed in the groove 3 of the strip and secured by clinching the separated portions of the strip upon the wire. The clinched association of the strip on the annular member may be obtained from passing the strip and wire between rolls, or by hammering operations of a conventional character, or in other ways. The cuts 10 are then punched in the strip, as by dies, to produce the separated segments 2, held together at their inner edges by means of the member 6. A length of material made up of connecting pieces thus obtained is cut off to form a piston ring of any desired size.

The spaced-apart arrangement of the segments 2 allows the pieces to be moved circumferentially with respect to one another, and an important feature of the invention consists in securing the pieces at their inner peripheral portions with connectors which are highly resilient, by means of which the pieces when compacted are made to spring back into a normal spaced-apart position.

In operation in a piston, the ring functions as a gapless ring with its ends adapted to abut one another, and the usual practice is to employ a side of ring which is of a greater circumference than the circumference of the cylinder in which the ring is to be installed. By so doing the ring is compacted and tends to exert constantly a radial pressure outwardly on the cylinder wall. This pressure allows the ring to conform to various irregularities in the cylinder wall surface, and at the same time to exert a uniform pressure all the way around the cylinder wall, and throughout every position in the cycle of movement of the piston in the cylinder.

The segments 2 when spaced apart by minute openings or interstices such as cuts 10 above described, combine to provide a highly satisfactory land surface for the ring, enabling it to seat properly against a side of a piston groove in which it is received. In addition, the size of the cuts 10 is sufficiently small, especially in the compacted position of the ring, to provide openings of approximately .001 to .003 of an inch in thickness, a size which has been found to be effective in preventing passage of oil between the segments in a direction axially of the ring. The ring throughout a portion of its radial width thus serves as an excellent sealing element as well as an oil scraping member.

It should be observed that the cuts 10 extend from the outer periphery of the ring through a substantial portion of its radial width. This outer radial portion of the ring in which the segments are spaced apart by the relatively smaller cuts 10 provides a circumferential rim or outer edge of a radial width large enough to extend from a cylinder wall into overlapping relation with a piston ring groove and thus prevent passage of oil thereby.

An important function of the oil ring is to remove excess oil from a cylinder wall, just prior to contact of the cylinder by combustion gases during the power stroke of the piston, and thus prevent carbonization and reduce oil consumption. As the piston moves downwardly of the cylinder, the ring of the invention becomes seated against that side of the piston groove, which pushes the ring downwardly. Since the substantially fluid-tight circumferential rim portion, above noted, is of sufficient radial width to extend between the cylinder wall and the piston groove side, a seal is provided.

Thereafter oil collected ahead of the ring on the down stroke of the piston cannot escape through it, neither can the oil pass between the circumferential rim portion of the ring and that piston side against which it is sealed. As a result there is no possibility of excess oil getting back on a cylinder surface which has been scraped and thereafter becoming burned by combustion gases. Instead substantially all of the oil which is scraped away is passed through openings in the piston groove and thence back to the crankcase.

The relatively thin edges 2a of the ring constitute highly effective oil scraping elements for removing oil from the wall of a cylinder and are of a size generally corresponding to that of oil scraping rings of conventional C-type. It should also be observed that the ring of the invention does not depend on radially extending oil passages and therefore is free from troubles caused by such passages becoming filled with carbon.

Another important feature of the ring of the invention consists in the use of one kind of metal for those parts of the ring which receive wear, and another kind of metal for the parts which are not subject to wear but are required to be highly resilient. For example, the steel used to form the segments 2 may be of a hardness particularly related to the hardness of the metal of a cylinder, and designed to resist wear most efficiently. At the same time, necessary toughness and resiliency which must be present in the connecting member may be separately provided for without limitation as to suitable hardness, and with less exacting methods of manufacturing being resorted to. By the use of two different types of metal, special hardening operations may be avoided, and an improved combination of a resilient supporting structure with a properly hardened wearing surface may be obtained.

The steps of cutting and punching the strip in the various ways described may be carried out by the use of "tool" machinery, such as punch press mechanism, cutting or shearing dies, sawing mechanism, press or rolling mechanism and the like. If desired, some change in the sequence of the operations noted may be resorted to. The method of forming the segments 2 from a continuous strip or sheet is particularly adapted to high-speed production, and by utilizing a separate element for supporting the pieces, desirable cutting operations may be resorted to of a character superior to cutting operations which could be carried out in making a ring from a single piece of metal. The combination of segments of piston ring material with a wire member as shown is intended to be illustrative of other multipiece rings as for example one in which axially spaced-apart rows of segments are supported by a separate resilient body, or one in which the wire member is attached at other points on the segments as at their under sides; or one in which separate connectors for each segment are provided, or in other ways.

In Fig. 7 a plurality of rings of the type illustrated in Figs. 5 and 6 have been shown in superimposed relation. It is intended that several of these rings may be employed, whose combined axial thickness will constitute a proper total thickness for the size of ring groove now conventionally resorted to in pistons. These rings are maintained separately of one another at all times and are free to move around one another and upwardly and downwardly during reciprocation of the piston.

In Figs. 8 and 9, a modification of piston ring has been illustrated consisting of two rows of pieces of piston ring material superimposed one upon another and held together by a single connecting member. The rows are made up of segments 18 and 19, with the segments 18 of one row being movably secured to one another by means of reversely bent portions 20, and the segments 19 of the other row being secured in movable relation to one another by means of the reversely bent portions 22. The reversely bent portions 20 and 22 are in turn connected together by axially extending portions 21 as is more clearly shown in Fig. 8.

Each of the segments 18 is formed with offset portions 23 which extend into overlapping relation with shouldered offset portions 24 of adjacent segments. By this construction, a seal is obtained at the point of contact of the overlapping portions 23 and 24, and no gas can pass radially of the ring from the inner openings 25 to the outer interstices 26.

A further feature of the ring modification of Figs. 8 and 9 consists in a staggered arrangement of internal interstices 31 and external interstices 30, occurring between the segments 19, with respect to the interstices 25 and 26 occurring between segments 18. This staggered relation of the inner and outer interstices in one row with respect to those of the other row provides for a continuous segment surface occurring adjacent all interstices which prevents combustion gas from passing through the ring in a direction axially thereof.

By the construction noted, it is possible to prevent passage of gases through the ring in directions both radially and axially thereof, and therefore the structure described is well adapted to functioning as a compression ring as well as an oil ring.

Various advantages are present in connection with the rings shown. There is provided a ring which is convenient to handle and quickly and easily assembled in a piston groove. The ring is provided with novel compressible and extensible character, rendering it particularly adapted for use with worn or irregular cylinder surfaces. The thin character of the rings provides outer peripheral edges which closely correspond to thin C-type rings of the type now commonly employed for oil metering in pistons and cylinders. The entire structure is adapted to be formed of tough materials such as steels, alloys, and the like, which further provides for a light, durable and cheap ring.

While I have shown a preferred embodiment of my invention, it should be understood that various changes and modifications may be resorted to, in keeping with the spirit of the invention as defined by the appended claims.

I claim:

1. A piston ring comprising a plurality of segments arranged in spaced-apart relation, said segments being connected to one another at their inner edges by means of a reversely bent member, said reversely bent member being secured between clinched inner edges of the segments at points intermediate the upper and lower sides of the segments.

2. A piston ring comprising a plurality of segments of piston ring material arranged in a plurality of annular rows, said segments having grooves formed at the inner edges thereof, a resilient connecting member disposed in the grooves of said segments and secured in clinched relation between the sides of the grooves, said connecting member extending radially in and out of grooves in segments of one of the rows, then axially of the ring, and then radially in and out of grooves of segments of another of the said rows.

3. A piston ring construction comprising a plurality of annular rows which include segments of piston ring material arranged in contiguous relation to one another, said segments having grooves formed at the inner edges thereof, a connecting member attached in the grooves of the segments and extending between the said rows axially of the ring to provide a circumferentially movable ring body, said segments of each of the rows having offset portions adapted to overlap one another in a plane at right angles to the axis of the ring, and the openings between the segments of one of the rows occurring in staggered relation with respect to the openings between the segments of the other row.

4. A piston ring comprising a plurality of segments arranged in circumferentially spaced-apart relation, said segments being connected to one another at their inner edges by means of a reversely bent resilient supporting member, the reversely bent portions of the resilient supporting member being secured between clinched inner edges of the segments at points intermediate the upper and lower sides of the segments, each of the segments being in contact with adjacent segments at a point intermediate the inner and outer peripheral edges of the ring.

THOMAS A. BOWERS.